United States Patent [19]

Demarthe et al.

[11] 4,282,188

[45] Aug. 4, 1981

[54] PROCESS FOR THE RECOVERY OF URANIUM CONTAINED IN PHOSPHATED SOLUTIONS

[75] Inventors: Jean-Michel Demarthe, Viroflay; Paolo Fossi, Elancourt; Dominique Guery, Plaisir, all of France

[73] Assignee: Minemet Recherche, Trappes, France

[21] Appl. No.: 935,943

[22] Filed: Aug. 23, 1978

[30] Foreign Application Priority Data

Aug. 25, 1977 [FR] France .............................. 77 25899

[51] Int. Cl.$^3$ .............................................. B01D 11/00
[52] U.S. Cl. ......................................... 423/10; 423/11
[58] Field of Search .................................... 423/10, 11

[56] References Cited

U.S. PATENT DOCUMENTS 2,849,281  8/1958  McCullough .......................... 423/10
2,882,123  4/1959  Long ...................................... 423/10

OTHER PUBLICATIONS

Murthy, T. et al., "Phenyl Phosphoric Acids for Extraction of Uranium from Phosphoric Acid", Chem. Abstracts vol. 75 (1971) #91741e.

*Primary Examiner*—Deborah L. Kyle
*Attorney, Agent, or Firm*—Fleit & Jacobson

[57] ABSTRACT

A process for recovering uranium contained in phosphated solutions including the steps of contacting the solution with a diester of pyrophosphoric acid, reextracting the uranium with an alkaline solution, precipitating the uranium, acidifying and agitating the resulting product, separating the organic phase from the aqueous phase and recycling the organic phase to the initial contacting step. The precipitate is separated prior to recycling.

20 Claims, No Drawings

PROCESS FOR THE RECOVERY OF URANIUM CONTAINED IN PHOSPHATED SOLUTIONS

The present invention concerns a process for the recovery of uranium contained in phosphated solutions. More specifically, it has as its aim the provision of a process for eluting the uranium present in an organic phase in the form of a pyrophosphoric diester salt.

It is known that natural phosphates are, essentially, composed of tricalcic phosphates which absolutely cannot be assimilated by plants, so that they cannot be used for fertilizer. This is why the major aspect of the phosphate industry consists in transforming natural tricalcic phosphates into phosphates which can be assimilated by plants and, more particularly, into superphosphates which make up the fertilizers which are widely used.

The first step of this transformation is an acid lixiviation, in general employing sulfuric acid, which converts tricalcic phosphate into phosphoric acid and into soluble calcium phosphate. This lixiviation also frees various metals, such as uranium, thorium, vanadium and rare earth metals, which are trapped in phosphate veins over the ages.

The concentration of these metals in phosphated ores is very low. Thus, for uranium, it lies generally between 0.005 and 0.02%. Although these concentrations are low, and due to the high market value of uranium and to its strategic character, people have sought for a quarter century for a way of recovering the uranium contained in acid lixiviation solutions of phosphated ores.

Only one of the different recovery processes which have been conceived, has any found significant industrial importance. It consists of subjecting the lixiviation solution to a liquid-liquid extraction by means of an organic phase containing a diester of pyrophosphoric acid.

This technique, which is described in detail in U.S. Pat. No. 2,866,680, permits a very rapid and complete recovery of the uranium present, even at very low concentrations and, in various types of solutions.

Although this utilization of pyrophosphates presents great advantages, it also includes some serious drawbacks. For example, the pyrophosphates are hydrolized very rapidly, which makes it necessary to often renew the organic extraction phase, which is a burden as far as the costs of operating the process are concerned. Also, the uranium-pyrophosphate complex is so stable that a very powerful reagent is required to reextract the uranium.

Therefore, up to now, attempts to conduct an elution in an alkaline medium have not permitted regeneration of the pyrophosphoric ester and have generally produced organic uranium pyrophosphate precipitates which required calcination to eliminate every trace of organic material. In addition, the uranium-containing organic phase contains phosphates the presence of which hinders reextraction when it contacts a phase rich in phosphates.

Up to the present time, only the use of hydrofluoric acid has given appreciable results as far as reextraction is concerned. However, the utilization of this acid, on the one hand, accelerates considerably the hydrolysis of the pyrophosphates, with all of its attendant drawbacks which have been mentioned above, and, on the other hand, requires the use of very expensive materials because of the toxic and corrosive character of hydrofluoric acid. Finally, the use of the latter does not permit one to obtain directly uranium oxide, which is well known in the art as "yellow cake".

An added drawback of the known process which has just been described lies in the fact that the diesters of pyrophosphoric acid are not very selective, so that they extract, in addition to uranium, an important part of the other metals trapped in the phosphates. At the time of reextraction, these metals are precipitated pell-mell by the hydrofluoric acid and they make very impure the uranium fluoride which is obtained.

This is why one of the aims of the present invention is to furnish a new process for recovery of uranium by liquid-liquid extraction using pyrophosphoric acid diesters, a process in which hydrolysis of the latter is strongly reduced in comparison with the known processes.

Another aim of the invention is to supply a process for the reextraction of the uranium present in an organic phase which contains a diester of pyrophosphoric acid, this process avoiding the use of hydrofluoric acid.

An additional aim of the invention is to supply a new process for the recovery of the uranium contained in phosphated solutions which will permit the direct production of the "yellow cake" mentioned above.

These aims, as well as others which will appear further below, are attained by means of the process according to the invention which comprises the following steps:

(a) placing into contact the initial uranium-bearing phosphated solution with an organic phase containing a pyrophosphoric acid diester;

(b) placing into contact with an alkaline solution the organic phase charged with uranium obtained in the preceding step;

(c) addition to said alkaline solution of a uranium precipitation agent;

(d) acidification of the product resulting from the preceding step (c);

(e) agitation, then separation of the organic phase from the aqueous phase;

(f) recycling of said organic phase towards said step (a) of placing into contact;

a solid-liquid separation operation, for example by filtration, being carried out between steps (c) of addition of a uranium precipitation agent and (f) of recycling.

In an advantageous method of carrying out this process, this solid-liquid separation immediately follows step (c), the addition of an uranium precipitation agent. In this case, acidification (d) concerns only the liquid portion which results from the separation. In other words, if this solid-liquid separation is a filtration, it is only the filtrate which is acidified.

Nevertheless, it follows that it is equally possible to acidify both the precipitate and the liquid portion resulting from step (c) with the solid-liquid separation conducted later.

Preferably, step (a) is preceded by a reduction assuring all of the uranium is present in the IV valence state. This reduction is advantageously carried out by means of metallic iron.

The alcoholic chains of pyrophosphoric acid diester mentioned above, which is also a diacid, and which will often be termed "pyrophosphate" for reasons of simplification, may be linear or ramified. They may also include functions other than the alcohol function and, in particular, they may present one or several ether functions. As examples of chains capable of being esterified in order to produce pyrophosphates of dialcoyl presenting one or several ether functions, one may point to the alcohols obtained by condensation of a heavy alcohol such as that defined below, with an alkylene oxide, such as ethylene or propylene oxide, or with various alkylene polyoxides such as the ethylene polyoxides or the propylene polyoxides having a high molecular weight, that is, whose molecular weight is between approximately 1.000 and 10.000. By the expression "heavy alcohol", which was used above, is meant an alcohol presenting alcoholic chains which includes 4 to 20 carbon atoms and, preferably, 6 to 12 carbon atoms.

As pyrophosphoric acid diester, one may, in particular, use dicaproyl pyrophosphate, or the dioctyl pyrophosphate which will then be referred to by its acronym "OPPA" (octyl pyrophosphoric acid).

With respect to the condensation of the alcohols defined above with phosphoric anhydride $P_2O_5$, a condensation which leads to the pyrophosphates used in the process according to the present invention, it can be carried out according to the method described in the U.S. Pat. No. 2,947,774.

On the other hand, research which led to the present patent application has shown that it was possible to increase resistance to the hydrolysis of the pyrophosphates by adding to the organic phase liposoluble compounds having electronic doublets capable of giving hydrogen links with tthe pyrophosphoric acid diesters. Among these compounds, which will be termed in what follows "stabilizing agents", one may note that trialkyl phosphates as, for example, tributyl phosphate, which will sometimes by referred to by its acronym "TBP" (tributyl phosphate), the oxides of trialkylphosphine as, for example, trioctylphosphine oxide, and the heavy alcohols as defined above.

As stabilizing agent, one will preferably use octanol-2. On the other hand, the weight ratio between the stabilizing agent and the diester of pyrophosphoric acid lies advantageously between ⅓ and 3.

This addition of a stabilizing agent permits the process of the present invention to be carried out at temperatures higher than those which were formerly used. Thus the extraction may be carried out at a temperature on the order of 40° C., even 50° C.

The concentration of the pyrophosphoric acid diester in the organic phase described above is, preferably, between 1 and 10% by weight, the remainder of this phase being composed of a diluent selected from those which are well known to specialists in this field, such as kerosene and dodecane.

The process of the invention is especially well suited to phosphated solutions whose composition and pH lie between the values shown in the following table:

|  | Usual Field | Preferred Field |
| --- | --- | --- |
| $P_2O_5$ | from 10 to 45% | from 25 to 35% |
| Ca | from 0 to saturation | from 0 to 2 g/l |
| Fe total | from 2 to 30 g/l | from 5 to 20 g/l |
| H | from 10 mg/l to saturation | higher than 100 mg/l |
| $SO_4$ | from 0 to 40 g/l | from 5 to 30 g/l |
| $F^-$ | from 0 to 40 g/l | from 0 to 20 g/l |
| Actinides and rare earth metals | from 0 to the limit of solubility | from 0 to 100 mg/l |
| pH | $\leq 2$ | $\leq 1$ |

The concentration of vanadium has no influence on the process and it may be noted that, however much a hindrance it may be, the presence of rare earth metals and actinides in great quantities is not an obstacle to carrying out the invention.

The ratio between the volume of the organic phase and that of the aqueous phase which, subsequently, will be often more simply referred to as "O/A", is advantageously between 1/100 and 1 in the step (a) extraction and between 1 and 100 in the step (b) reextraction.

After the reextraction of the uranium, the resulting alkaline solution must have a pH between 7 and 11 and, preferably, between 8 and 10. The solution which contacts the organic phase in the step (b) reextraction may be composed of alkaline hydroxide, alkaline carbonate, as well as ammonia, ammonium carbonate, ammonium phosphate and/or phosphate of alkaline metal. An ammoniacal solution is preferably used.

While not intending to give this information a limiting character, one may mention that, during step (b), at least a portion of the pyrophosphate passes into the aqueous phase and it seems that the major part of the reextracted uranium is in the form of a pyrophosphate complex.

The agent for precipitation of the uranium in step (c) may be a sulfide or a phosphate, but this choice leads to obtaining sulfides or phosphates of uranium. This is why an oxidation agent is preferably used, which permits the direct precipitation of uranium in an oxidized form.

As oxidation agent, one may use chlorine, hypochlorites, chlorates and, in a more general fashion, all oxidation agents whose normal apparent potential is higher than 300 millivolts. One should note, however, that it is preferable to use hydrogen peroxide, the persulfates, as well as all compounds producing hydrogen peroxide in contact with water, as, for example, oxylith.

Steps (b) and (c) mentioned above may be combined.

The step (d) acidification should be carried out so as to bring the pH to a value between −1 and 3 and, preferably, between 0 and 1.

At this stage in the description, it must be noted that after step (b), the organic phase may either be separated from the aqueous phase or it may accompany the latter in the treatments which it undergoes. In the first case, the organic phase should once again be placed into contact with the aqueous phase after or during acidification in order to reextract the pyrophosphoric acid diester.

The examples which follow have as their object to permit those of ordinary skill in the art to determine the operative conditions which should be adopted in any particular case. These examples are not intended as a limitation on the present invention.

EXAMPLE 1

The aim of this example is to study the influence exerted on the stability of dioctyl pyrophosphate—or OPPA—by a series of contacts of this product with, successively, a base and an acid. This example demonstrates the influence of the stabilizing agents on the process of the present invention.

Several organic phases composed of kerosene are prepared as follows:

3% of dioctyl pyrophosphate (OPPA);

3% of OPPA and 3% of tributyl phosphate (TBP);

3% of OPPA and 3% of octanol-2.

All of these percentages, as well as those which will be shown further below, unless otherwise stated, are calculated in weight and refer to the total weight of the organic phase used.

Each of the organic phase mentioned above is placed in contact with twice-normal ammonia, with the O/A ratio equal to 5, then it is reacidified by sulfuric acid at 33%, the volume of the latter being identical to the volume of ammoniac used before.

This cycle of contact with a base, then with an acid, is repeated three times with a titration of the acidity of OPPA being done after each cycle.

In addition, an aliquot of the organic phase is charged with a 32% phosphoric acid solution containing 1 g/l of uranium in state IV. Then the aqueous phase is separated from the organic phase and the uranium contained in the latter is measured.

In certain cases, the tests are first carried out with a freshly prepared organic phase, then with an identical phase prepared one month previously.

The results obtained are summarized in the following table:

|  | Normality of organic phase | | | | | Uranium total charge in the organic phase (mg/l) | | |
|---|---|---|---|---|---|---|---|---|
|  | Fresh OPPA | 1-mo. old OPPA | Fresh OPPA + TBP | 1-mo. old OPPA + TBP | Fresh OPPA + oct. | 1 mo. old OPPA | 1 mo. OPPA + TBP | Fresh OPPA + oct |
| Beginning | 0.130 | 0.126 | 0.125 | 0.109 | 0.127 | 2620 | 2090 | 2890 |
| 1st cycle | 0.104 | 0.096 | 0.107 | 0.087 | 0.112 | 2230 | 1670 | 2710 |
| 2nd cycle | 0.093 | 0.080 | 0.099 | 0.090 | 0.109 | 1820 | 1740 | 2560 |
| 3rd cycle | 0.088 | 0.068 | 0.092 | 0.088 | 0.106 | 1470 | 1640 | 2510 |
| 4th cycle | 0.081 | 0.062 | 0.087 | 0.086 | 0.105 | 1300 | 1680 | 2490 |

The preceding table shows that tributyl phosphate—or TBP—plays a stabilizing role vis-a-vis the dioctyl pyrophosphate (OPPA), but that it lowers the quantity of uranium extracted per gram of pyrophosphate. In other words, TBP presents a marked anti-synergetic effect for the extraction of uranium-IV.

The best stabilizing agent is octanol-2 which, in addition, does not have the harmful anti-synergetic effect of TBP. In fact, octanol-2 does not reduce the quantity of uranium extracted per gram of pyrophosphate.

Finally, the freshly diluted dioctyl pyrophosphate deteriorates less quickly than the same product which was prepared one month previously.

EXAMPLE 2

In this example, the influence of the pH of the aqueous phase on the reextraction of uranium-IV by ammonium carbonate or by ammonia is studied.

The following components respectively are diluted with kerosene:
  3% of dioctyl pyrophosphate (OPPA);
  3% of OPPA and 3% of tributyl phosphate (TBP);
  3% of OPPA and 10% of TBP.

With an O/A ratio equal to unity, the organic phases thus prepared are placed in contact with various aqueous reextraction phases. Three of these phases are aqueous solutions of ammonium carbonate containing respectively 0.5, 1 and 2 times the quantity of carbonate stoichiometrically necessary in relation to the OPPA initially introduced which is counted as a diacid. Another aqueous phase is composed of an ammoniacal aqueous solution in a two-times stoichiometric quantity bolstered by 2% in volume of hydrogen peroxide at 110 volumes.

The results of these experiments are shown in the following table, where:
  $\phi_A$ means "aqueous phase";
  $\phi_O$ means "organic phase";
  $(U^T)$-$\phi_O$ represents the total uranium concentration in the organic phase;
  QS means "stoichiometric quantity".

| Nature of re-extractant | Quantity of re-extractant | Nature of the organic phase | | | | | |
|---|---|---|---|---|---|---|---|
|  |  | OPPA 3% | | OPPA 3% + TBP 3% | | OPPA 3% + TBP 10% | |
|  |  | $\phi_A$ pH | $(U^T)$-$\phi_O$ (mg/l) | $\phi_A$ pH | $(U^T)$-$\phi_O$ (mg/l) | $\phi_A$ pH | $(U^T)$-$\phi_O$ (mg/l) |
| $(NH_4)_2CO_3$ | 0.5 | 8.4 | 42 | 7.1 | 2590 | 3.15 | 2940 |
| $(NH_4)_2CO_3$ | 1 | 8.5 | 17 | 7.7 | 186 | 5.9 | 2790 |
| $(NH_4)_2CO_3$ | 2 | 8.5 | 32 | 8.2 | 24 | 7.8 | 1410 |
| $NH_4OH + H_2O_2$ | 2 | 8.8 | <5 | 8.5 | <5 | 8.5 | 5 |

This example shows, on the one hand, that the organic phase is not reextracted in a satisfactory manner when the pH is lower than 8.2 and, on the other hand, that the tributyl phosphate (TBP) extracts much of the phosphoric acid, thereby leading to extra consumption of the reagent.

In addition, this example shows that the mixture of ammoniacal and oxygenated water constitutes a good reextraction agent.

EXAMPLE 3

In this example, an organic phase containing 3% dioctyl pyrophosphate and 3% tributyl phosphate is used, and its deterioration is studied as a function of its contact time with two basic aqueous phases which are identical to those which one uses during the reextraction according to the process of the invention.

One of these aqueous phases is a twice normal ammoniac solution. The other is identical to the first, but in addition contains 2% by volume of hydrogen peroxide at 110 volumes. In both cases, the O/A ratio is equal to unity.

After contact with one of these base phases, the organic phase is regenerated by one volume of 33% sulfuric acid, then it is placed in contact with a synthetic solution of 30% phosphoric acid containing 1 g/l of uranium-IV. During this contact, the O/A ratio is equal to 1/5.

In order to verify whether there is deterioration of the organic phase during its contact with the base phase, one varies the duration of the contact between a very short time, about 3 minutes, and four hours.

On the other hand, a reference organic phase is simply put into contact with the phosphoric acid solution and one notes that it is thereby charged with 2985 mg/l of uranium.

The following table shows the results of these experiments:

| Reextractant | Total uranium in the organic phase in mg/l after a contact of: | | | |
|---|---|---|---|---|
| | 3 minutes | ½ hour | 1 hour | 4 hours |
| NH$_4$OH only (2N) | 2625 | 2620 | 2700 | 2845 |
| NH$_4$OH (2N) + H$_2$O$_2$ | n.d. | 2700 | 2735 | 2870 | n.d. = not determined

In the time framework studied, the mixture containing 3% of dioctyl pyrophosphate and 3% of tributyl phosphate in kerosene substantially maintains the same power of reextraction.

EXAMPLE 4

This example concerns the influence of the amount of reextraction agent on the alkaline reextraction of uranium.

In order to study this influence, three organic phases, which are identical to those of example 2, are used. For its part, the alkaline reextraction phase is a solution of ammonium carbonate whose concentration has been varied.

During the reextraction, the O/A ratio is equal to unity. On the other hand, the decantation time and the contact time during the reextraction are both equal to 5 minutes.

For each aqueous phase and for each organic phase, the following table gives respectively the pH and the concentration in total uranium after reextraction, it being understood that the pH is determined at equilibrium.

The abbreviations used in this table are the same as those used in the preceding example.

| Concentration in (NH$_4$)$_2$CO$_3$ of the aqueous phase (QS) | Nature of the organic phase | | | | | |
|---|---|---|---|---|---|---|
| | OPPA 3% | | OPPA 3% + TBP 3% | | OPPA 3% + TBP 10% | |
| | $\phi_A$ pH | $\phi_O$ (U$^T$) (mg/l) | $\phi_A$ pH | $\phi_O$ (U$^T$) (mg/l) | $\phi_A$ pH | $\phi_O$ (U$^T$) (mg/l) |
| 0.5 | 8.4 | 42 | 7.1 | 2590 | 3.15 | 2940 |
| 1 | 8.5 | 17 | 7.7 | 186 | 5.9 | 2790 |
| 2 | 8.5 | 32 | 8.2 | 24 | 7.8 | 1410 |
| 7.4 | 8.8 | ≦5 | 8.5 | ≦5 | 8.5 | 5 |

This example shows that, in order to reextract almost all of the uranium contained in the organic phase, it is necessary to operate at a pH greater than 8. It also shows that a relatively small contact time between the aqueous and organic phases is sufficient to obtain an excellent reextraction of the uranium, which is very favorable to the economic aspect of the process.

EXAMPLE 5

In this example, a complete process in accordance with the present invention is conducted as follows:

(a) 250 ml of an organic phase, composed of kerosene containing 3% dioctyl pyrophosphate and 3% tributyl phosphate, are used, and one charges them by means of a synthetic solution of uranium at 1 g/l in phosphoric acid at 30%, with the uranium being in the form of uranium-IV. The organic phase thus charged contains 3160 mg of uranium per liter.

(b) One proceeds to a reextraction by means of an aqueous solution of two-molar ammonia to which is added 2% in volume of oxygenated water at 110 volumes, with the O/A ratio being equal to 5. One thus obtains the formation of a "yellow cake" which one separates by centrifugation of all of the liquid phases. After drying, this "yellow cake" titrates 57.6% uranium.

(c) The organic phase is then regenerated by adding to all of the liquid phases 50 ml of sulfuric acid at 50%. 50 ml of aqueous phase are thus obtained and 240 ml of organic phase.

(d) The organic phase which was regenerated during step (c) above is recharged under the same conditions as step (a) above: 50 ml of this organic phase are recharged to 2590 mg/l of uranium, while the initial organic phase had been charged to 3160 mg/l of uranium, which signifies a loss of efficiency of 18%.

The following table shows the volume of each of the phases encountered in the different steps above, as well as the concentration of the total uranium of various phases and of the "yellow cake".

| | | Volume (ml) | Total uranium |
|---|---|---|---|
| Charge | Organic phase | 250 | 3160 mg/l |
| | Aqueous phase | 1250 | |
| Reextraction | Organic phase | 250 | |
| | Aqueous phase | 50 | |
| | "Yellow cake" | | 57,6% |
| Regeneration of the organic phase | Organic phase | 240 | |
| | Aqueous phase | 90 | |
| Recharge | Organic phase | 50 | 2590 mg/l |
| | Aqueous phase | 250 | |

This example shows that, by the succession of basic reextraction operations and regeneration by reacidification, one may obtain, on the one hand, a direct recovery of the uranium in the form of a concentrate with a high concentration, and, on the other hand, a regeneration of the organic phase which substantially maintains its extraction capability for the treatment of new quantities of uranium-bearing phosphated solutions.

We claim:

1. A process for recovering uranium contained in phosphate solutions comprising the steps of:

(a) contacting a uranium-containing phosphate solution with an organic phase which contains a diester of pyrophosphoric acid, whereby a product containing an organic phase and an aqueous phase results, with the uranium being extracted from the aqueous phase into the organic phase;

(b) contacting the resulting uranium-containing organic phase with an alkaline solution, in an amount sufficient to, and at a pH which will, enable extraction of at least a portion of the uranium into the aqueous phase which is present after the addition of the alkaline solution;

(c) adding a uranium precipitation agent to the aqueous phase resulting from step (b) so as to form a uranium-containing precipitate, where the agent is present in sufficient amount for and is capable of resulting in the formation of the precipitate;

(d) acidifying the liquid of the product resulting from step (c);

(e) agitating the resulting acidified liquid;

(f) separating the organic phase from the aqueous phase of the liquid; and (g) recycling the organic phase to step (a); and wherein the precipitate produced in step (c) is recovered from the liquid prior to conducting the recycling step.

2. The process of claim 1, wherein separation of the precipitate is conducted after step (c) and wherein only the liquid portion which results from said separation is acidified in step (d).

3. The process of claim 1, wherein the alcoholic chains of said diester of pyrophosphoric acid contain from 6 to 12 carbon atoms.

4. The process of claim 3, wherein the diester of pyrophosphoric acid is symmetrical caproyl pyrophosphate or dioctyl pyrophosphate.

5. The process of claim 1, wherein the pH of the aqueous phase resulting from step (b) is between about 8 and 10.

6. The process of claim 1, wherein said alkaline solution is an ammoniacal solution.

7. The process of claim 1, wherein the uranium precipitation agent is selected from the group consisting of sulfides and alkaline phosphates.

8. The process of claim 1, wherein the uranium precipitation agent is an oxidation agent whose normal apparent potential is equal to at least 300 millivolts.

9. The process of claim 8, wherein the uranium precipitation agent is selected from the group consisting of persulfates and compounds producing hydrogen peroxide in contact with water.

10. Process according to claim 8, wherein uranium precipitation agent is hydrogen peroxide.

11. The process of claim 1, wherein a stabilizing agent selected from the group consisting of trialkyl phosphates, oxides of trialkyl phosphine and heavy alcohols is added to the organic phase of step (a).

12. The process of claim 11, wherein the stabilizing agent is octanol-2.

13. The process of claim 11, wherein the weight ratio between the stabilizing agent and the diester of pyrophosphoric acid is between about $\frac{1}{3}$ and 3.

14. The process of claim 11, wherein step (a) is preceded by a reduction step to convert uranium into the IV state.

15. The process of claim 14, wherein the reduction is carried out by contacting the phosphated solution with metallic iron.

16. The process of claim 1, conducted at a temperature greater than 20° C.

17. The process of claim 1, wherein the pH reached during the acidification step is between about $-1$ and 3.

18. The process of claim 1, wherein the ratio between the volume of the organic phase and the volume of the aqueous phase is between about 1/100 and 1 in step (a) and between about 1 and 100 in step (b).

19. The process of claim 1, wherein the concentration of the diester of pyrophosphoric acid in said organic phase is between about 1 and 10% by weight.

20. A process for recovering uranium contained in phosphate solutions comprising the steps of:

(a) contacting a uranium-containing phosphate solution with an organic phase which contains a diester of pyrophosphoric acid, whereby a product containing an organic phase and an aqueous phase results, with the uranium being extracted from the aqueous phase into the organic phase;

(b) contacting the resulting uranium-containing organic phase with an alkaline solution, in an amount sufficient to, and at a pH which will, enable extraction of at least a portion of the uranium into the aqueous phase which is present after the addition of the alkaline solution;

(c) adding a uranium precipitation agent to the aqueous phase resulting from step (b) so as to form a uranium-containing precipitate, where the agent is present in sufficient amount for and is capable of resulting in the formation of the precipitate;

(d) combining all liquids resulting from previous steps and acidifying them;

(e) agitating the resulting acidified liquid;

(f) separating the organic phase from the aqueous phase of the liquid; and (g) recycling the organic phase to step (a); and wherein the precipitate produced in step (c) is recovered from the liquid prior to conducting the recycling step.

* * * * *